United States Patent [19]
Smati

[11] Patent Number: 5,695,655
[45] Date of Patent: *Dec. 9, 1997

[54] LONGITUDINAL SETTLER WITH FLOW SEPARATION

[75] Inventor: Abdellatif Smati, Suresnes, France

[73] Assignee: Degremont, Rueil Malmaison, France

[*] Notice: The term of this patent shall not extend beyond the expiration date of Pat. No. 5,620,600.

[21] Appl. No.: 531,334

[22] Filed: Sep. 20, 1995

[30] Foreign Application Priority Data

Oct. 4, 1994 [FR] France .................. 94 11854

[51] Int. Cl.$^6$ .................................................. B01D 21/04
[52] U.S. Cl. .................. 210/800; 210/803; 210/519; 210/525; 210/527; 210/536
[58] Field of Search .................. 210/86, 104, 519, 210/521, 525, 526, 527, 532.1, 536, 540, 800, 803

[56] References Cited

U.S. PATENT DOCUMENTS

| | | | |
|---|---|---|---|
| 2,118,157 | 5/1938 | Camp | 210/526 |
| 2,509,933 | 5/1950 | Lind | 210/526 |
| 2,708,520 | 5/1955 | Dallas | 210/526 |
| 3,489,287 | 1/1970 | Streander | 210/526 |
| 3,774,770 | 11/1973 | Sparham et al. | 210/527 |
| 4,401,576 | 8/1983 | Meurer | 210/525 |
| 4,514,303 | 4/1985 | Moore | 210/525 |
| 5,047,150 | 9/1991 | Mitchell | 210/527 |
| 5,078,861 | 1/1992 | Krofta | 210/86 |
| 5,366,638 | 11/1994 | Moore | 210/527 |

FOREIGN PATENT DOCUMENTS

| | | |
|---|---|---|
| 2 378 550 | 8/1978 | France . |
| 2101494 | 1/1983 | United Kingdom . |

*Primary Examiner*—Christopher Upton
*Attorney, Agent, or Firm*—Pollock, Vande Sande & Priddy

[57] ABSTRACT

A continuous longitudinal settler with flow separation including an entry zone for the liquid to be treated, including a system for distribution of this liquid; a zone for homogenization of the flow, ensuring a dissipation of the entry energy and a constant velocity profile at the exit of this zone; a working zone for settling, exhibiting a homogeneous flow along the whole length of which a constant velocity profile is maintained, together with a high Froude number guaranteeing the stability of the liquid flow; and a zone for separation and for recovery of the flows, situated at the downstream end of the settler, the treated liquid being discharged at the surface and the settled matter via the bottom of the settler.

18 Claims, 5 Drawing Sheets

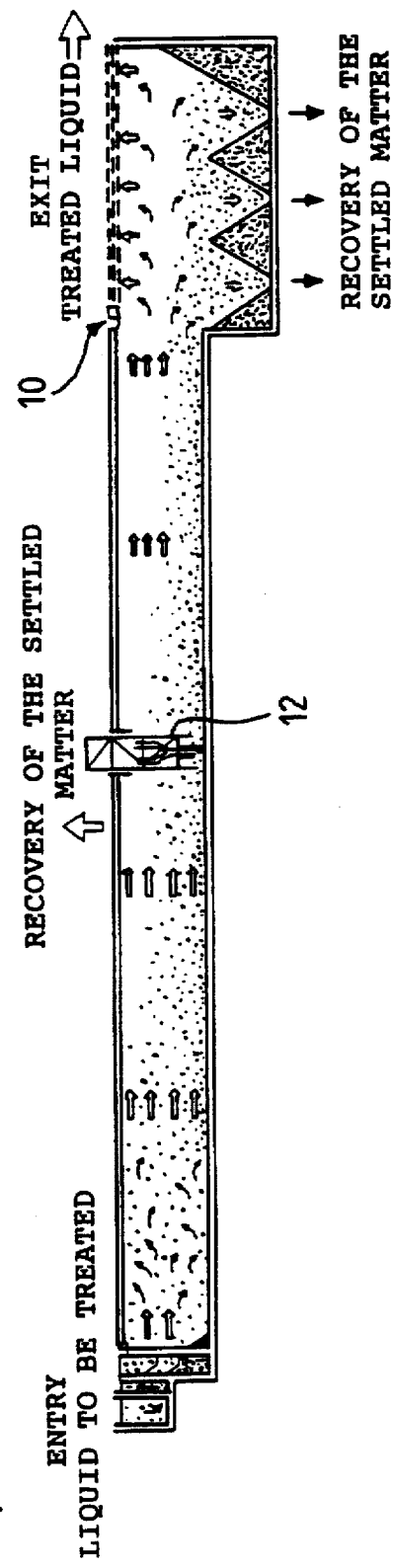
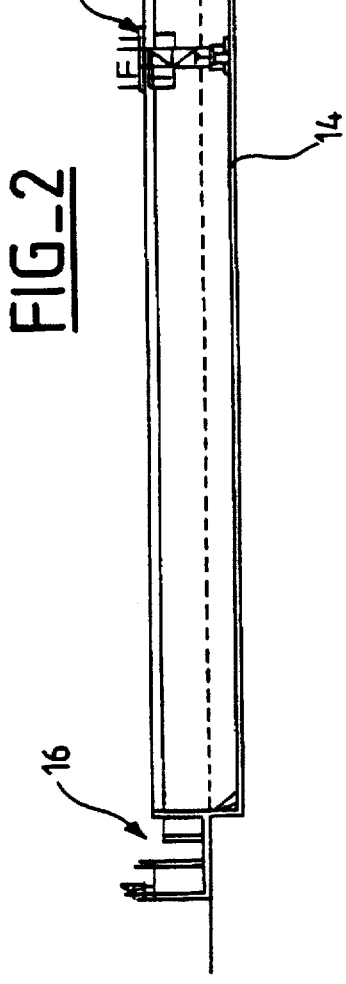

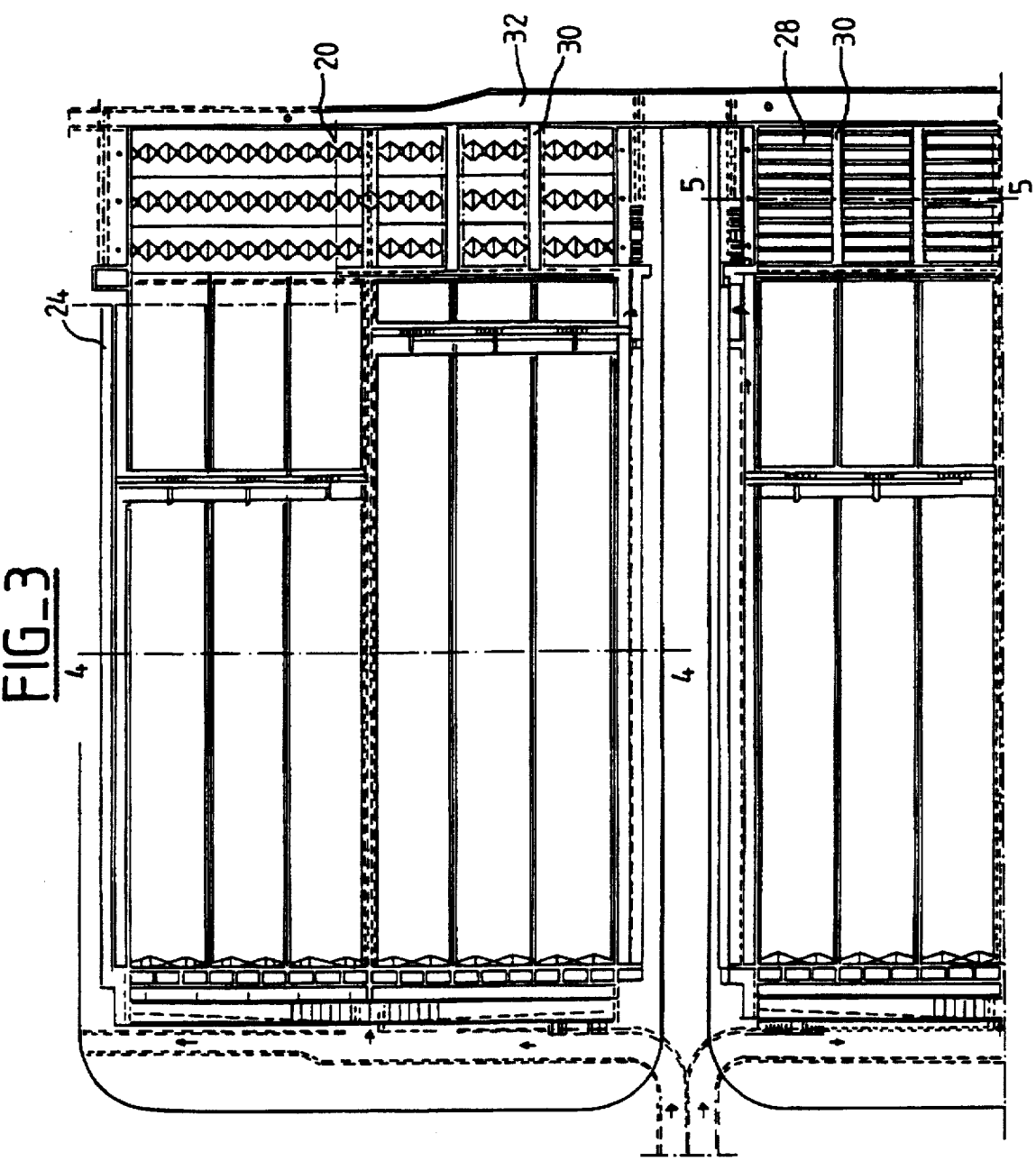

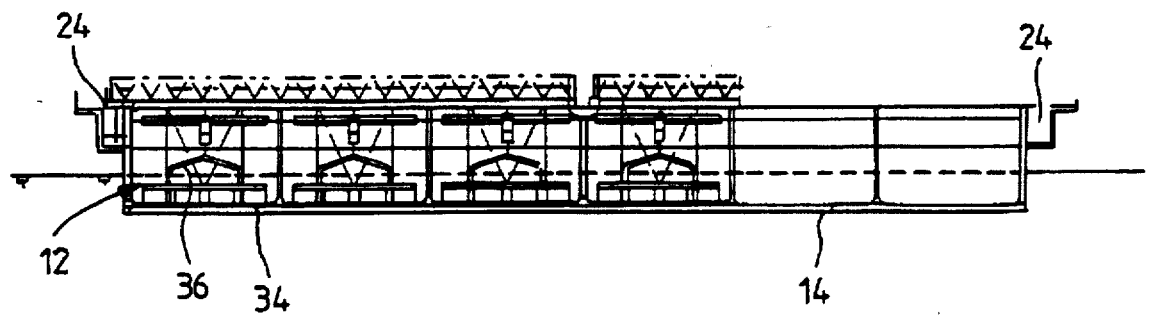
FIG_4
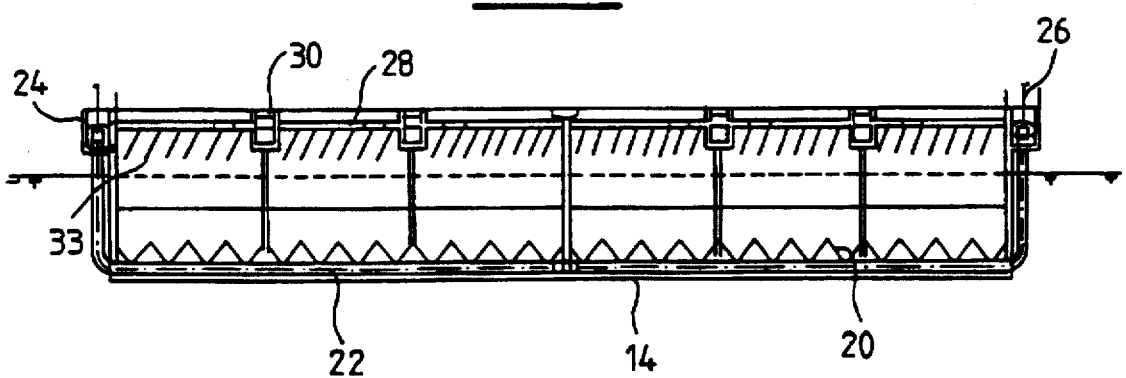
FIG_5

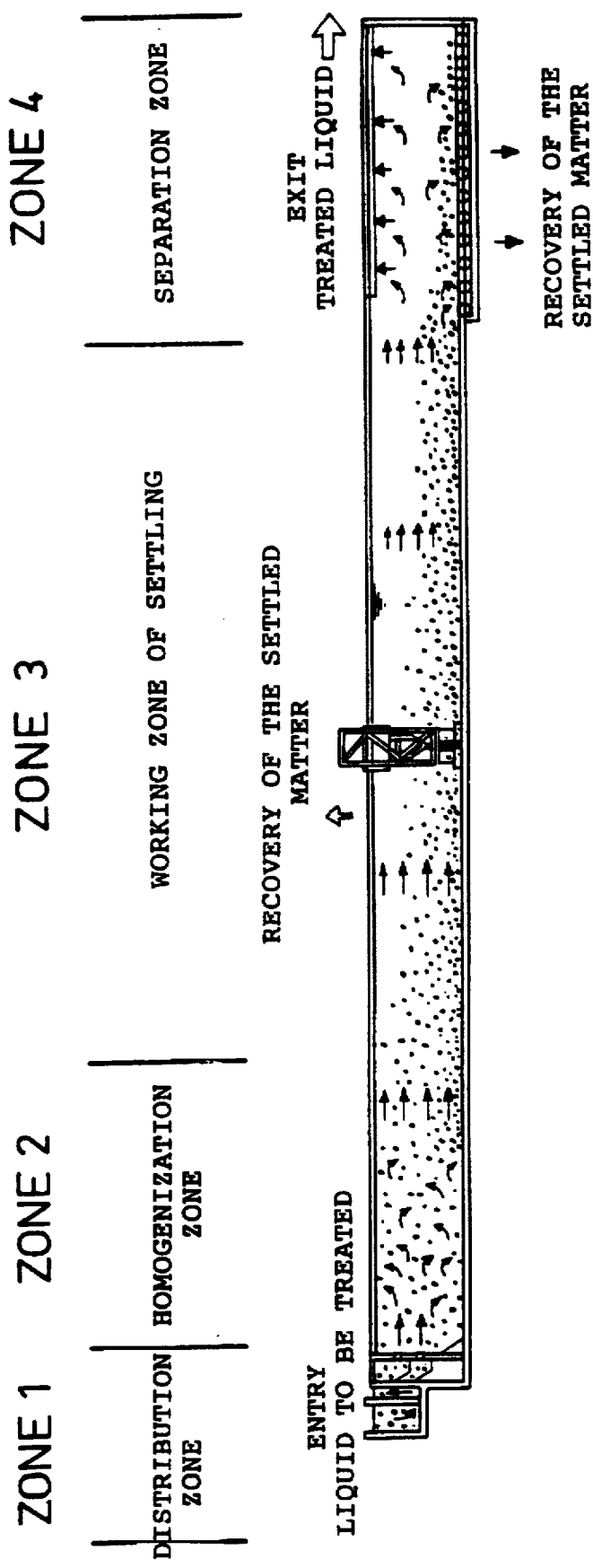
FIG_6

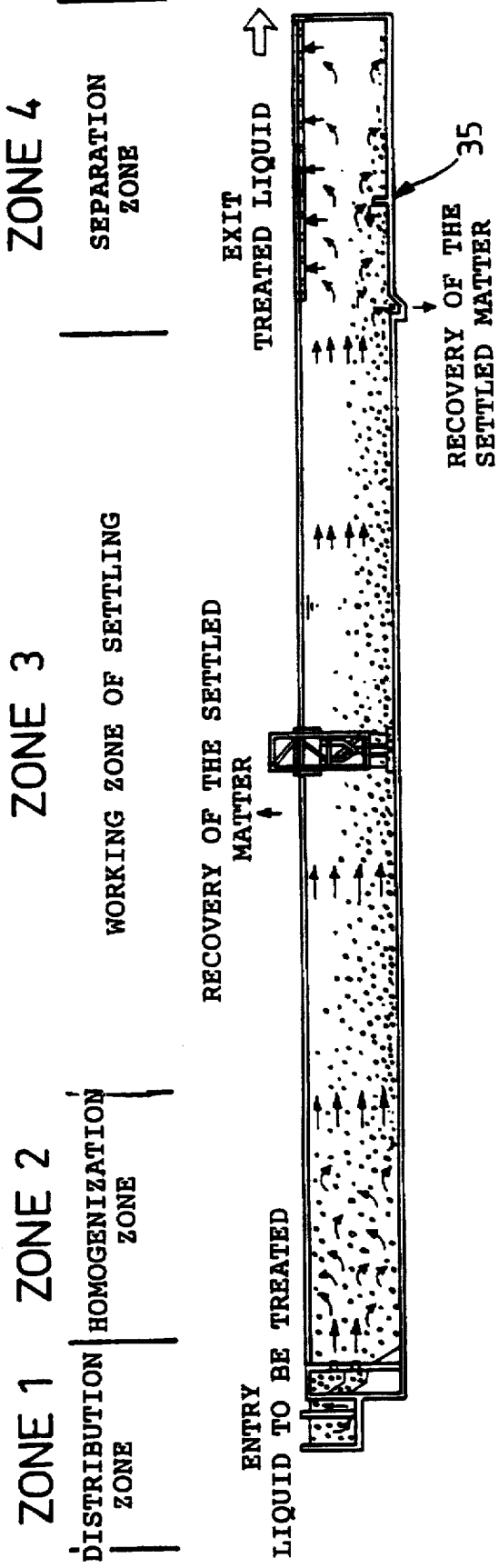
FIG_7

LONGITUDINAL SETTLER WITH FLOW SEPARATION

FIELD OF THE INVENTION

The present invention relates generally to a device which makes it possible to separate continuously the immiscible matter contained in a liquid, in the form of an emulsion or suspension, and is aimed more particularly at a longitudinal settler with flow separation, which can be utilized, for example, in a water treatment plant (especially settling, clarification or oil separation).

BACKGROUND OF THE INVENTION

It is known that a continuous settler must be constructed so that:

the flow regime should be homogeneous, with as little turbulence as possible and as stable as possible, so as to obtain horizontal and perfectly parallel fluid filaments over the whole length of the structure or at the very least over its major portion;

the entry zone should be as small as possible and should make it possible to obtain a distribution which is as perfect as possible, of the raw liquid to be treated and a homogeneous flow regime;

the recovery of the clarified liquid and that of the settled matter should be as uniform as possible, so as not to give rise to any significant perturbation of the homogeneous flow regime.

When a longitudinal settler with horizontal flow is produced, the difficulty which is encountered is that of ensuring a good hydraulic distribution over a vertical plane, both at the entry of the structure and at its exit, and the problems which are encountered are those posed by the accumulation, the collection and the discharge of the settled matter, especially of sludge.

In order to solve the abovementioned problems, attempts are made to obtain, as far as possible, a circulation that has the least possible turbulence throughout the settler, which is characterized by the lowest possible values of the Reynolds number. Furthermore, it is also known that the Froude number allows the stability of a flow regime to be assessed: the more stable the circulation, the more uniform is the distribution of the velocities over the whole section of the settling tank, stable circulations being characterized by high Froude numbers.

Reference may be made on this topic to the "Mémento Technique de l'Eau" ["Water Technology Memorandum"], 9th edition 1989, published by assignee, pages 158 to 166.

The above considerations demonstrate the importance of the internal hydraulics of a settler, which is the overall result of the geometry of the settler, of the devices for the entry and exit of liquids and for recovery of the settled matter, especially of the sludge, and of the relative arrangement of these three devices.

It is known that a zone of calm and unperturbed flow regime is needed to produce an optimum settling, this zone being defined as being the working zone of settling, in which the flow velocity profile is regular. A settler has proportionally better performance the greater the size of this working zone in relation to the overall dimensions of the structure.

However, in most of the settlers constructed at present, the working zone of settling is greatly reduced as a result of the perturbations induced especially, on the one hand, by the liquid entry system which does not fulfil its function of energy dissipation and of distribution and, on the other hand, by the device for recovery of the treated liquid, which gives rise to inflow currents whose perturbing effect is felt in the major portion of the structure.

The invention proposes to provide an improved horizontal settler which is noteworthy especially for outstanding internal hydraulics making it possible to obtain a very good efficiency.

Consequently, this invention relates to a continuous longitudinal settler with flow separation, characterized in that it includes:

an entry zone for the liquid to be treated, including a system for distribution of this liquid;

a zone for homogenization of the flow regime, ensuring a dissipation of the entry energy and a regular and substantially flat velocity profile at the exit of this zone;

a working zone of settling exhibiting a homogeneous flow regime, along the whole length of which a regular and substantially flat velocity profile is maintained, together with a high Froude number guaranteeing the stability of the liquid flow regime; and a zone for separation and for recovery of the flows, situated at the downstream end of the settler, the treated liquid being discharged at the surface and the settled matter via the bottom of the settler.

According to the present invention, the zone for entry and distribution of the liquid to be treated may be produced in accordance with the characteristics defined co-pending patent application Ser. No. 08/621,510 by the present assignee and entitled: "Improvements made to settlers". According to this preferred embodiment, this entry zone comprises a system for the distribution of liquid, which consists of a plurality of calibrated openings made in the partitions of the chamber for allowing the liquid to enter. These openings are fed with liquid from a feed channel so that each opening should receive a determined fraction of the flow of the liquid, the said openings being arranged according to at least two horizontal arrays. Reference may be made to this patent application, especially with regard to the technical effects and advantages provided by this preferred solution.

According to the present invention the zone for separation and for recovery of the flows includes:

in its upper portion a system of gutters for recovery of the treated liquid, these gutters being arranged preferably over the whole width of the structure, and in its lower portion, either a system of hoppers in which the settled matter is deposited, the latter being recovered from the hoppers by any conventional means, or a system for scraping and for recovery of the settled matter.

According to another embodiment of the present invention, the zone for separation and for recovery of the flows includes:

in the upper portion, means for recovery of the treated liquid, which may be produced in the form of gutters or of an immersed network of perforated pipes which are situated near the surface of the settler;

in the lower portion, means for recovery of the settled matter, preferably produced in the form of an immersed network of perforated pipes positioned at the bottom of the settler.

According to a preferred embodiment, the zone for separation and for recovery of the flows is provided with a system of sensors for the treated liquid—settled matter interface, enabling a regulation of the recovery of the settled matter to be obtained.

According to the invention, and in the case where it is applied to the treatment of suspensions, the recovery of the floating matter is performed with the aid of transverse gutters which may be arranged either upstream of the structure, in the zone of entry of the liquid, or downstream, at the entry of the zone for separation and for recovery of the flows, or simultaneously in both these places.

According to the invention, the settler is of the type with separate channels, optionally with communicating walls, each channel comprising the four zones defined above, the number of channels being chosen so as to obtain the desired Reynolds number.

According to a preferred embodiment, a device for recovery of the settled matter is provided in the second and third zone, which may be produced conventionally in the form of a movable scraper bridge which may be provided with suction pipes that enable a recovery of the settled matter in these two zones to be carried out.

According to another embodiment of the present invention, in the zone for separation and for recovery of the flows, the settler additionally comprises a laminar system in order to produce a refining of the settling.

Other characteristics and advantages of the present invention will emerge from the description which is given below with reference to the attached drawings which illustrate an example of embodiment thereof which is devoid of any limiting nature. In the drawings:

BRIEF DESCRIPTION OF THE FIGURES

FIG. 1 is a basic diagram showing a settler according to the invention in axial section, in its application to the treatment of suspensions;

FIG. 2 is a view in lengthwise axial section of an embodiment of a settler according to the invention;

FIG. 3 is a plan view of the settler according to FIG. 1,

FIG. 4 is a larger-scale view of FIG. 3 in section along 4.4,

FIG. 5 is a larger-scale view of FIG. 3 in section along 5.5,

FIG. 6 is a basic diagram similar to FIG. 1, relating to the application of the invention to the treatment of emulsions, and FIG. 7 is a basic diagram similar to FIG. 6 with a system for scraping and for recovery of the settled matter, in the lower portion of the separation zone.

DETAILED DESCRIPTION OF THE INVENTION

Reference is made firstly to the diagram in FIG. 1, relating to the application of the invention to the treatment of suspensions, in which the other zones of a settler according to the invention have been marked out:

Zone 1 is that through which the entry of the liquid to be treated takes place, for example a raw water containing matter in suspension, especially an industrial or urban waste water. This zone 1 comprises a system for distribution of the liquid to be treated and, in this example of preferred embodiment, this system includes a plurality of openings placed and designed so as to obtain a practically uniform dispersion of the jets of liquid in all directions, while occupying virtually all of the section offered to the flow regime. As explained above, this distribution system is preferably produced in accordance with the arrangements provided in co-pending application, mentioned above and to which the reader may refer. This system will therefore not be described again.

Zone 2, which follows the liquid entry and distribution zone 1, forms a zone for homogenization of the flow regime. Its length is determined so as to obtain a natural dissipation of the entry energy and a flat velocity profile at its exit.

Zone 3 is the working zone for the settling and it exhibits a homogeneous and unperturbed flow regime of the liquid throughout its length, this calm flow regime making it possible to maintain a regular velocity profile. As can be seen in this FIG. 1, the size of this zone 3 is large in relation to the general size of the settler, and this makes it possible to obtain an optimum efficiency of the latter.

Zone 4 forms the exit zone for the settled matter and for the treated liquid, in which any distortion of the velocities in relation to the preceding zone must be avoided. The separation and the recovery of the flows: treated liquid/settled matter, are therefore carried out in this zone 4, the treated liquid being recovered at the surface and the settled matter via the bottom of the settler. In the example of embodiment illustrated in FIG. 1, which applies to the treatment of suspensions, the settled matter is collected in a system of hoppers which will be described in detail below.

In the nonlimiting example of embodiment shown in this FIG. 1, this zone 4 comprises, at its entry and over its whole width, a transverse gutter for recovery of the floating matter, referred to by reference 10. This recovery of the floating matter may also be carried out at the exit of the zone 1. It is obviously possible to envisage means for recovery of the floating matter at the exit of this zone 1 and at the entry of the zone 4. This recovery of the floating matter, performed at the beginning of the zone 4 and obtained with the aid of a transverse gutter arranged over the whole width of the settler, makes it possible to protect the exit of the treated liquid. A natural siphoning is thus produced over the width of the structure, and this contributes to making its construction easier.

A device for recovery of the settled matter has also been shown, at 12, in this FIG. 1. This device may be produced conventionally in the form of a scraper bridge, optionally provided with suction pipes, as will be described below.

Reference is now made to FIGS. 2 to 5, which show in detail a nonlimiting example of embodiment or the device of the invention in accordance with the diagram of FIG. 1.

In these FIGS. 2 to 5 it is seen that the settler according to the present invention takes the conventional form of a tank referred to in its entirety by reference 14, partitioned into channels with the aid of separating walls, which may be communicating, as is clearly seen in FIG. 3. This settling tank 14 comprises, at its entry in the zone corresponding to the zone 1 of FIG. 1, a device for allowing the entry of and for distributing the liquid to be treated, which is referred to in its entirety by reference 16, which may be, for example, of the type mentioned above and which, consequently, will not be described, it being possible for the reader to refer to the abovementioned co-pending application.

Following the entry and distribution device 16, each channel of the settling tank comprises the zones 2 and 3 in accordance with FIG. 1. The description of these two zones will therefore not be repeated.

As already seen, the zone 4 of this settler thus comprises means for simultaneous separation and recovery of the settled matter and of the treated liquid. These means are referred to in their entirety by reference 18 (FIG. 2).

In this example of application to the treatment of suspensions, the settled matter is collected in a system of hoppers such as 20, it being possible for each hopper 20 to be provided at its base with a discharge orifice emerging into a collecting pipe 22 (FIG. 5), from which the settled matter is delivered into collecting gutters such as 24, placed at the periphery of the structure (see FIG. 3), the recovery of the settled matter being carried out through the intermediacy of valves, for example of the telescopic type 26 (FIG. 5).

This recovery of the settled matter may be performed by any appropriate means, for example with the aid of gravity suction pipes emerging into gutters arranged at the surface of the settler and in which the liquid level is lower than that in the settler, or else by any known means for pumping out, for example through the intermediacy of pipes provided with emulsion pumps, emerging into gutters arranged at the surface of the settler and in which the liquid level may be higher than that in the settler.

This same zone 4 comprises the system of gutters which, according to the invention, ensures the recovery and the discharge of the treated liquid. In order to maintain an unperturbed flow regime in this zone 4 a recovery of the treated liquid is carried out over the whole surface of this zone, in contrast to the traditional arrangements in which the recovery of the treated water is performed through the intermediacy of side gutters, which gives rise to inflow currents whose effects are felt far upstream of this zone for discharge of the treated liquid, thus perturbing the flow regime in the settler. Thus, in this example of embodiment, the recovery of the treated liquid in the zone 4 is performed through the intermediacy of a network of transverse gutters such as 28, emerging into lengthwise gutters such as 30, the treated liquid being subsequently discharged through the intermediacy of a collector channel 32.

As shown in FIGS. 2 and 5, the device according to the present invention may additionally comprise a system for laminar settling 33, placed in the zone 4, in order to further improve the settling.

According to an alternative form of the invention the said system of gutters for recovery of the treated liquid may include a network of lengthwise gutters emerging into one or a number of transverse gutters, the treated liquid being discharged from this system of gutters through the intermediacy of the collector channel 32.

It was seen above that, according to the invention, it was possible to provide a system for recovery of the settled matter, such as 12, arranged in the zones 2 and 3 of the settling tank. This system may be of a conventional "movable scraper bridge" type comprising scraper blades such as 34 (FIG. 4), and each scraper blade may be provided with a suction pipe such as 36. This alternative form of the invention makes it possible to produce a scraped settler with suction of the settled matter, which may be employed especially in a plant for clarification of liquids and especially of waste water, using activated sludge. However, this is merely an example of application and an embodiment, no limitation being implied thereby.

FIG. 6 illustrates the application of a settler according to the invention to the treatment of emulsions. The four zones whose characteristics were defined in the preceding description are encountered again in this FIG. 6, only the zone 4 for separating the flows being produced differently. In this application the recovery of the treated liquid is performed in the upper portion of this zone, for example through the intermediacy either of gutters as specified above or of an immersed network of perforated pipes situated near the surface of the settler, and the recovery of the settled matter is performed with the aid of an immersed network of perforated pipes positioned at the bottom of the settler.

In the alternative form of the invention, illustrated by FIG. 7, the recovery of the settled matter in the zone 4 is performed with the aid of a scraping system 35.

As stated above, the settler according to the invention enables a practically constant velocity to be maintained over the whole length of its tank, and this allows an outstanding stability of the flow regime to be obtained. This result is due to the combined characteristics of the zone 1 for entry and distribution of the liquid to be treated, of the zones 2 and 3 which have a sufficient length in order to obtain and maintain the stability of the liquid flow regime, and of the zone 4 for separation and for recovery of the flows, the functioning of which has no detrimental effect on the stability of the upstream flow regime of the liquid to be treated.

According to an alternative form of the invention a lamellar settler may also be provided in the zone 4, which makes it possible to improve the separation of the matter in suspension in the treated liquid and to collect nonhomogeneous matter, and this enables a refining of the settling to be produced.

Means which make it possible to regulate the recovery of the settled matter as a function of the flow rate of the treated liquid may also be provided according to the invention. In fact, the settler according to the present invention is characterized by a very clean surface of separation of the flows at the entry of the zone 4, and this makes it possible, with the aid of sensors, to detect the position in height of this surface of treated liquid/settled matter separation and to produce a system for servo control of the recovery of the settled matter in the lower portion of the fourth zone, for example as a function of the flow rate.

Among the advantages provided by the device according to the invention there may be mentioned, in particular:

an outstanding efficiency of the settling resulting from the stability of the flow regime of the liquid over the whole length of the structure, due to the factors mentioned above, a simplification of the construction, resulting especially from the fact that, in contrast to the previous solutions, the recovery of the treated liquid is not performed by a system of side gutters but over the whole width of the structure, and this makes it easier to produce the roll surfaces for a scraper bridge, possibility of choosing the number of channels of the settler tank so as to preserve the desired Reynolds number, without reduction in the Froude number.

The settler according to the invention can be applied to the separation of any immiscible matter present in a liquid, in the form of an emulsion or of a suspension, for example to settling, to clarification, to oil separation and the like. It will preferably be utilized, of course, in a water treatment plant for separating the matter in suspension which is present in industrial or urban waste water. The settler can also be utilized, as already mentioned, in a plant for clarification of waste water with sludge recirculation.

It remains clearly understood that the present invention is not restricted to the examples of embodiment and of utilization which have been described and/or mentioned here, but that it includes all the alternative forms thereof.

I claim:

1. A longitudinal settler comprising:
   an entry zone for distributing liquid to be treated, the zone having a plurality of calibrated openings made in partitions of an initial chamber for allowing influent liquid to enter, these openings being supplied with liquid from a feed channel for allowing each opening to receive a predetermined fraction of the flow of liquid, the openings being arranged in at least two rows;
   a lowest row of openings located at a height chosen to avoid the development of a bottom current liable to disturb a sediment layer on floor of the settler; and further wherein a highest row of openings being configured to create a higher flow rate than the lowest row of openings;

a homogenization zone separated and located downstream of the entry zone for ensuring energy dissipation of liquid introduced from the entry zone, the homogenization zone being sufficiently long to allow the liquid flowing through the homogenization zone to develop a constant velocity profile and laminar flow at the end of the homogenization zone with lower flow rates at lower heights of the settler;

a working zone of sufficient length downstream and continuous with the homogenization zone for maintaining a laminar flow along the entire length of the working zone that maintains a constant velocity profile as well as a high Froude number to assure liquid flow stability through the working zone;

a zone located downstream and continuous with the working zone for separation and recovery of settled matter from treated liquid and including (a) at least one gutter located across the width of an upper separation and recovery zone portion for recovering treated liquid;

(b) a plurality of hoppers located in a lower portion into which is deposited settled matter for final retrieval;

the treated liquid being discharged at the surface of the separation and recovery zone while the settled matter is discharged via the bottom thereof, without perturbing the upstream constant velocity profile.

2. A settler as set forth in claim 1 wherein the separation and recovery zone further comprises a plurality of scrappers located in the lower portion for scrapping and recovering settled matter.

3. A settler as set forth in claim 2 wherein the gutters further comprise a network of transverse gutters interconnecting with at least one lengthwise gutter, recovery of settled matter from the gutters occurring alter discharge to a collector channel.

4. A settler as set forth in claim 2 wherein the gutters further comprises a network of lengthwise gutters interconnecting with at the least one transverse gutter, recovery of settled matter from the gutters occurring after discharge to a collector channel.

5. A settler as set forth in claim 1 wherein the gutters further comprise a network of transverse gutters interconnecting with at least one lengthwise gutter, recovery of settled matter from the gutters occurring after discharge to a collector channel.

6. A settler as set forth in claim 1 wherein the separation and recovery zone further comprises gravity suction pipes interconnected to gutters located at the surface and in which the liquid level is lower than that in the surrounding zone, the pipes recovering settled matter.

7. The settler set forth in claim 6 further comprising a network of perforated pipes immersed near the surface of the separation and recovery zone for recovering treated liquid therein.

8. A settler as set forth in claim 1 wherein the separation and recovery zone further comprises emulsion pumps connected to pipes that communicate with gutters located at the surface and in which the liquid level is higher than that in the surrounding zone, the pipes recovering settled matter.

9. The settler set forth in claim 8 further comprising a network of perforated pipes immersed near the surface of the separation and recovery zone for recovering treated liquid therein.

10. The settler set forth in claim 1 further comprising an immersed network of perforated pipes positioned on the bottom of the separation and recovery zone for recovering settled matter therein.

11. The settler set forth in claim 10 further comprising a network of perforated pipes immersed near the surface of the separation and recovery zone for recovering treated liquid therein.

12. The settler set forth in claim 1 further comprising a network of perforated pipes immersed near the surface of the separation and recovery zone for recovering treated liquid therein.

13. The settler set forth in claim 1 further comprising a transverse gutter immersed near the surface of the entry zone and/or the separation and recovery zone for recovering treated liquid therein.

14. The settler set forth in claim 1 further comprising separate chambers for all the zones, the chambers having walls in each zone that selectably communicate with each other, the number of chambers being preselected to obtain a desired Reynolds number.

15. The settler set forth in claim 1 together with means located in the entry and homogenization zones for recovering settled matter therein.

16. The settler set forth in claim 15 wherein the means for recovering settled matter further comprises a movable scraper bridge, selectably provided with suction pipes.

17. A method for treating liquid flowing through a longitudinal settler, the method comprising the steps:

subjecting the liquid to an entry zone having a plurality of calibrated openings made in partitions of an initial chamber for allowing influent liquid to enter, these openings being supplied with liquid from a feed channel for allowing each opening to receive a predetermined fraction of the flow of liquid, the openings being arranged in at least two rows;

a lowest row of openings located at a height chosen to avoid the development of a bottom current liable to disturb a sediment layer on floor of the settler; and further wherein a highest row of openings creates a higher flow rate than the lowest row of openings;

subjecting the liquid to a homogenization zone separated and located downstream of the entry zone for ensuring energy dissipation of liquid introduced from the entry zone, the homogenization zone being sufficiently long to allow the liquid flowing through the homogenization zone to develop a constant velocity profile and laminar flow at the end of the homogenization zone with lower flow rates at lower heights of the settler;

subjecting the liquid to a working zone of sufficient length downstream and continuous with the homogenization zone for maintaining a laminar flow along the entire length of the working zone accompanied by a constant velocity profile as well as a high Froude number to assure liquid flow stability through the working zone;

subjecting the liquid to a zone located downstream and continuous with the working zone for separation and recovery of settled matter from treated liquid;

discharging the treated liquid at the surface of the separation and recovery zone while the settled matter is discharged via the bottom thereof, without perturbing the upstream constant velocity profile.

18. The method of claim 17 wherein the discharging of treated liquid is accomplished by subjecting surface liquid in the separation and recovery zone to at least one collection path extending transversely to a flow path of the liquid through the zones.

* * * * *